United States Patent
Nice et al.

(10) Patent No.: US 9,443,084 B2
(45) Date of Patent: Sep. 13, 2016

(54) AUTHENTICATION IN A NETWORK USING CLIENT HEALTH ENFORCEMENT FRAMEWORK

(75) Inventors: Nir Nice, Kfar Veradim (IL); Anat Eyal, Tel Aviv (IL); Chandrasekhar Nukala, Redmond, WA (US); Sreenivas Addagatla, Redmond, WA (US); Eugene Neystadt, Kfar-Sab (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 969 days.

(21) Appl. No.: 12/338,268

(22) Filed: Dec. 18, 2008

(65) Prior Publication Data

US 2010/0115578 A1 May 6, 2010

Related U.S. Application Data (60) Provisional application No. 61/110,937, filed on Nov. 3, 2008.

(51) Int. Cl.
*H04L 29/06* (2006.01)
*G06F 21/57* (2013.01)
(Continued)

(52) U.S. Cl.
CPC .............. *G06F 21/577* (2013.01); *G06F 21/31* (2013.01); *G06F 21/33* (2013.01); *H04L 63/08* (2013.01); *H04L 63/1441* (2013.01); *G06F 2221/2129* (2013.01)

(58) Field of Classification Search
CPC ............... H04L 63/08; H04L 63/1441; G06F 2221/2129
USPC ..................................................... 726/1, 9, 3
See application file for complete search history.

(56) References Cited

U.S. PATENT DOCUMENTS 6,243,816 B1    6/2001  Fang et al.
6,275,944 B1    8/2001  Kao et al.
(Continued)

FOREIGN PATENT DOCUMENTS

CN    101218576 A    7/2008
EP    1802155 A1    6/2007
(Continued)

OTHER PUBLICATIONS

Windows Vista Security Series: Building Plug-ins for Network Access Protection http://msdn.microsoft.com/en-us/library/bb945062.aspx, Oct. 2007, printed on Dec. 18, 2008.
(Continued)

*Primary Examiner* — Ellen Tran
(74) *Attorney, Agent, or Firm* — Aneesh Mehta; Kate Drakos; Micky Minhas (57) ABSTRACT

A network with authentication implemented using a client health enforcement framework. The framework is adapted to receive plug-ins on clients that generate health information. Corresponding plug-ins on a server validate that health information. Based on the results of validation, the server may instruct the client to remediate or may authorize an underlying access enforcement mechanism to allow access. A client plug-in that generates authentication information formatted as a statement of health may be incorporated into such a framework. Similarly, on the server, a validator to determine, based on the authentication information, whether the client should be granted network access can be incorporated into the framework. Authentication can be simply applied or modified by changing the plug-ins, while relying on the framework to interface with an enforcement mechanism. Functions of the health enforcement framework can be leveraged to provide authentication-based functionality, such as revoking authorized access after a period of user inactivity or in response to a user command.

18 Claims, 4 Drawing Sheets

(51) Int. Cl.
  *G06F 21/31*  (2013.01)
  *G06F 21/33*  (2013.01)

(56) References Cited

U.S. PATENT DOCUMENTS

| | | | |
|---|---|---|---|
| 6,362,836 | B1 | 3/2002 | Shaw et al. |
| 6,624,760 | B1 | 9/2003 | Kinzel |
| 2003/0055994 | A1* | 3/2003 | Herrmann et al. ........... 709/229 |
| 2003/0191817 | A1 | 10/2003 | Fidler |
| 2004/0177247 | A1 | 9/2004 | Peles |
| 2004/0228541 | A1 | 11/2004 | Ikenoue |
| 2005/0125677 | A1 | 6/2005 | Michaelides |
| 2005/0216421 | A1 | 9/2005 | Barry et al. |
| 2005/0268107 | A1 | 12/2005 | Harris |
| 2006/0026670 | A1 | 2/2006 | Potter et al. |
| 2006/0033606 | A1 | 2/2006 | Howarth et al. |
| 2006/0085850 | A1 | 4/2006 | Mayfield |
| 2006/0179472 | A1* | 8/2006 | Chang et al. ..................... 726/2 |
| 2006/0206932 | A1* | 9/2006 | Chong ............................ 726/10 |
| 2007/0006288 | A1* | 1/2007 | Mayfield et al. ................. 726/5 |
| 2007/0101409 | A1* | 5/2007 | Palekar et al. .................... 726/4 |
| 2007/0107050 | A1 | 5/2007 | Selvarajan |
| 2007/0136573 | A1 | 6/2007 | Steinberg |
| 2007/0143629 | A1 | 6/2007 | Hardjono |
| 2007/0174630 | A1 | 7/2007 | Shannon |
| 2007/0180122 | A1* | 8/2007 | Barrett .......................... 709/227 |
| 2007/0186099 | A1 | 8/2007 | Beck |
| 2007/0234040 | A1* | 10/2007 | Hurst et al. .................... 713/156 |
| 2008/0163340 | A1 | 7/2008 | Cheeniyil |
| 2008/0201780 | A1 | 8/2008 | Khan |
| 2008/0208957 | A1 | 8/2008 | Ding |
| 2008/0215760 | A1* | 9/2008 | Song et al. .................... 709/248 |
| 2008/0244703 | A1* | 10/2008 | Takahashi ......................... 726/3 |
| 2008/0244724 | A1 | 10/2008 | Choe |
| 2009/0094164 | A1 | 4/2009 | Fontaine et al. |
| 2009/0178109 | A1 | 7/2009 | Nice |

FOREIGN PATENT DOCUMENTS

| | | |
|---|---|---|
| JP | 2006072446 | 9/2007 |
| JP | 2006134312 | 11/2007 |
| JP | 2009-147927 A | 7/2009 |
| WO | WO 0154044 A1 | 7/2001 |
| WO | 2007005039 A1 | 1/2007 |
| WO | WO 2007-005039 A1 | 1/2007 |
| WO | WO 2007145540 A2 | 12/2007 |

OTHER PUBLICATIONS

Windows Server 2008—NAP (Network Access Protection) http://www.computerperformance.co.uk/Longhorn/server_2008_nap.htm, printed on Dec. 18, 2008.
NAP and FCS http://blogs.technet.com/clientsecurity/archive/2008/06/18/nap-and-fcs.aspx, printed on Dec. 18, 2008.
NAP Server-Side Architecture http://msdn.microsoft.com/en-us/library/cc895519(VS.85).aspx, printed on Dec. 18, 2008.
International Search Report and Written Opinion for International Application No. PCT/US2009/060990 mailed May 27, 2010.
A Two-Factor Mobile Authentication Scheme for Secure Financial Transactions: published date Jul. 11-13, 2005, http://ieeexplore.ieee.org/ie15/9999/32116/01493584.pdf?tp=&isnumber=32116&arnumber=1493584&htry=3.
Phone-Based Two-Factor Authentication Now Available for OpenID: May 12, 2008, retrieved date Apr. 15, 2010, http://www.reuters.com/article/pressRelease/idUS151722+12May-2008+BW20080512.
"China Third Office Action", Mailed Date: Oct. 17, 2013, Application No. 200980143793.X, Filed Date: Oct. 16, 2009, pp. 16.
"China Second Office Action", Mailed Date: Jul. 16, 2013, Application No. 200980143793.X, Filed Date: Oct. 16, 2009, p. 12.
"Chinese Office Action", Mail Date: Jan. 30, 2014, Application No. 200980143793.X, Filed Date: Oct. 16, 2009, pp. 10.
Translation of Office Action from Japanese Patent Office provided from Yuasa and Hara Japanese law firm, Mailed Date: Oct. 17, 2013, Japanese Patent Application No. 2011-535585, pp. 4.
Partial translation of "Artifice of Corporate User / Non-precipitation based on experience / Increasing the number of items of logs obtained in an abnormal situation", Nikkei Systems, Nikkei BP Corporation, Jun. 26, 2006, No. 159, pp. 30-33, provided by Yuasa and Hara Japanese law firm.
Patent Abstracts of Japan, "Sample Analysis Method and Sample Analyzer", Application No. 2006-072446, Filed Date: Mar. 16, 2006, pp. 1.
USPTO Non-Final Office Action, Mailed Date: Jun. 7, 2012, U.S. Appl. No. 12/815,215, filed Jun. 14, 2010, pp. 10.
USPTO Non-Final Office Action, Mailed Date: Oct. 15, 2012, U.S. Appl. No. 12/815,215, filed Jun. 14, 2010, pp. 11.
USPTO Non-Final Office Action, Mailed Date: Jun. 21, 2013, U.S. Appl. No. 12/815,215, filed Jun. 14, 2010, pp. 12.
USPTO Final Office Action, Mailed Date: Oct. 8, 2013, U.S. Appl. No. 12/815,215, filed Jun. 14, 2010, pp. 11.
Patent Abstracts of Japan, "Image Data Output Device and Output Destination Specifying Server Device", Application No. 2006-134312, Filed Date: May 12, 2006, pp. 1.
"First Office Action", Mailed Date: Apr. 8, 2013, Application No. 200980143793.X, Filed Date: Apr. 29, 2011, pp. 20.
"Decision on Rejection Received for China Patent Application No. 200980143793.X", Mailed Date: Jan. 30, 2014, Filed 10 Pages.
"Decision on Re Examination Received for China Patent Application No. 200980143793.X", Mailed Date: Jul. 31, 2014, 2 Pages.
"Notice of Allowance Received for Japan Patent Application No. 2011-535585", Mailed Date: Apr. 4, 2014, 4 Pages.
"Non-Final Office Action Received for U.S. Appl. No. 12/815,215", Mailed Date: Jan. 30, 2014, 12 Pages.
"Notice of Allowance Issued for U.S. Appl. No. 12/815,215", Mailed Date: Aug. 11, 2014, 17 Pages.
"Search Report Issued in European Patent Application No. 09829541.3", Mailed Date: Jan. 23, 2012, 6 Pages.
"Notice of Allowance Issued in Chinese Application No. 200980143793.X", Mailed Date: Sep. 1, 2014, 4 Pages.
"First Office Action Issued in Chinese Patent Application No. 201110170880.3", Mailed Date: Mar. 25, 2015, 17 Pages.
"Second Office Action Issued in Chinese Patent Application No. 201110170880.3", Mailed Date: Oct. 26, 2015, 12 Pages.

* cited by examiner

AUTHENTICATION IN A NETWORK USING CLIENT HEALTH ENFORCEMENT FRAMEWORK

RELATED APPLICATION

This application claims the benefit under 35 U.S.C. §119(e) of U.S. Provisional Application Ser. No. 61/110, 937, filed Nov. 3, 2008. The entire contents of the foregoing application is incorporated herein by reference.

BACKGROUND

For most private networks, some form of authentication is required before a client computer is allowed to access resources on the network. A client computer may be authenticated when the computer, or the user of the computer, provides authentication information, which may be based on one or more "factors." A factor may be something possessed by the user, such as a smart card, or something known to the user, such as a password, or some attribute of the user, such as a fingerprint or eyelid reading. The number of these factors required for authentication may depend on the risk of improperly granting access or likelihood that a client computer is not authorized to access the network.

Authentication information may be based directly on one or more of these factors. In other instances, authentication information may be derived indirectly from one or more of these factors. A client computer may provide one or more of these factors to a source trusted by a network administrator, which may then issue a certificate, identifying a device as a valid client. The certificate, whether alone or with other factors, may authenticate the client computer. Regardless of how the information is obtained, it may be used as part of an exchange between the client computer and an access control mechanism such that the access control mechanism only grants access if the client can be authenticated.

Various mechanisms may be employed to enforce a determination of whether to grant or deny access to a client. Typically, following an authentication process, an authorization process is performed using the authentication information together with additional parameters to determine the access rights of the specific client. The specific mechanism for a network may depend on the implementation of the transport layer of the network. In general, once a client is authenticated, the transport layer will route messages to or from the client. For devices that are not authenticated, even if physically connected to the network, the transport layer does not pass messages to or from the device.

A second, heretofore unrelated, issue for network administrators is "client health enforcement." In this context, "health" indicates a configuration of protective components of a device. Those components may be software tools, such as anti-virus software or a firewall. Alternatively, the protective components could be part of the operating system, such as a patch that remedies a vulnerability in a file management system or other operating system component. Configuration information that defines health of a component may include, in addition to data such as parameters of operation that have been set for the component, the operating status of the component, such as whether it is operational or disabled. Client computers without protective components or improperly configured or disabled protective components are at risk of being infected with computer viruses or otherwise subject to attack by malicious parties pose a risk to the network.

If a computer infected with a virus is given access to a network, the virus may readily spread over a network, particularly a private network. Private networks are generally configured to protect against attacks from outside the network. They are generally less equipped to guard against threats from devices on the network because it is presumed that all clients on the network can be trusted and a free flow of information among the trusted devices is desired. A device that, because of its poor health, is exposed to attack from outside parties can become a conduit for malicious parties to gain access throughout the private network. Accordingly, client devices in poor "health" may be excluded or given only limited access to a private network.

For these reasons, many private networks use some form of client health enforcement. As an example, MICROSOFT Corporation, of Redmond, Wash., USA, provides a health enforcement framework called Network Access Protection.™ In a network using this framework, even though a device may be authenticated to the network, the device is not initially allowed access, or is not allowed to continue with network access, unless it provides an acceptable statement of health to a health policy server.

The statement of health indicates the configuration of protective components on the client device. If that statement of health indicates the device is in compliance with network policies, the health policy server may indicate to the network access control mechanism that the device can be allowed access. On the other hand, if the statement of health is not in compliance with network policies, the health policy server may indicate to the network access control mechanism not to allow the device access. For devices denied access, the health policy server also may notify the device of the reasons why the client is not in compliance so that the client may remediate itself.

SUMMARY

Network administration is improved by using a client health enforcement framework to perform authentication services. The client health enforcement framework is adapted for authenticating client devices by formatting authentication information as part of a statement of health. Components that generate and validate the authentication information may be incorporated into the system using interfaces that would otherwise exist in the client health enforcement framework. Consequently, device authentication may be readily incorporated in any network configured for client health enforcement. Additionally, because the authentication components rely on the client health enforcement system to implement a decision to grant or deny network access to a device, the authentication components are not required to interface with the enforcement mechanism. As a result, authentication methods may be added or changed without the need to change network protocols or the enforcement mechanism.

Also, the same authentication components can be used regardless of the underlying network transport. The authentication components, because they rely on functionality of the client health enforcement system, are relatively simple and can readily operate with different enforcement mechanisms.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated the desirability of integrating authentication functions into a client health enforcement framework. Because this approach relies on the client health enforcement framework to implement a decision to grant or deny network access, authentication components can be relatively simple. As a result, authentication can be readily implemented or authentication approaches can be easily changed. For example, authentication methods can be easily combined. Moreover, because the authentication is separated from the enforcement mechanism by the client health enforcement framework authentication methods can be added or changed without changing the underlying network transport protocol or enforcement mechanism.

Further, functions of the client health enforcement framework can be adapted to provide authentication-related functions. As an example, functions in a client health enforcement system that support changes in network access based on changes in a client's health status may be used to implement functions that log a device off the network in response to user input or after some timeout period of inactivity. As another example, a statement of health reply, of the type conventionally provided by a client health enforcement framework, may be used to provide a device with a challenge that implements channel binding for added security.

Authentication components may be incorporated into a client health enforcement framework using interfaces that exist for interfacing health enforcement components into the framework. Though authentication systems are typically rigid, the inventors have recognized and appreciated that client health enforcement systems, such as the Network Access Protection™ framework, include simple and readily available interfaces to add new health enforcement components because Network Access Protection™ framework relies on third parties to supply health components as available protective software changes.

In a client health enforcement framework in which health information about a client device is gathered by statement of health agents tailored to gather information about different protective components, a client authentication component may interface to the framework in the same way as a statement of health agent. Though, rather than provide configuration information about a protective component, such an authentication component may interact with a user and/or one or more devices to obtain authentication information. The authentication information may then be provided to a client health access agent, which may then provide it, as part of a statement of health, to a health policy server that exists in the framework.

On the health policy server, portions of the statement of health associated with configuration of protective components may be provided to component health validators that are part of the framework. An authentication component to determine whether a client is authorized to access the network may be integrated into the health policy server using the same interface that is used to integrate component health validators. Accordingly, when appropriate authentication is not provided, the server receives an indication from the authentication component that the client is not allowed network access in the same way it receives an indication that the client is not appropriately configured. In response, the server indicates to the same enforcement mechanism used for client health enforcement that network access should not be granted.

The components integrated with the client health enforcement system in order to support authentication may exploit functions of the client health enforcement system other than granting or denying access. For example, in a client health enforcement system that revokes network access if a statement of health is updated to indicate an out of compliance health status, a client authentication component may, using an interface that triggers an updated statement of health, indicate a change in authentication status. The trigger, for example, may be sent by the client authentication component when it receives express user input or detects a period of user inactivity indicating that an authorized user is no longer using the client device. As another example, features of the client health enforcement system that indicate to the client device what remediation is required may be adapted to perform authentication-related functions, such as channel binding or execution of other protocols that involve back and forth exchanges of information.

The techniques described herein may be employed in any suitable client health enforcement framework. An exemplary embodiment of a computer system with such a framework is illustrated in FIG. 1.

Figure 1:
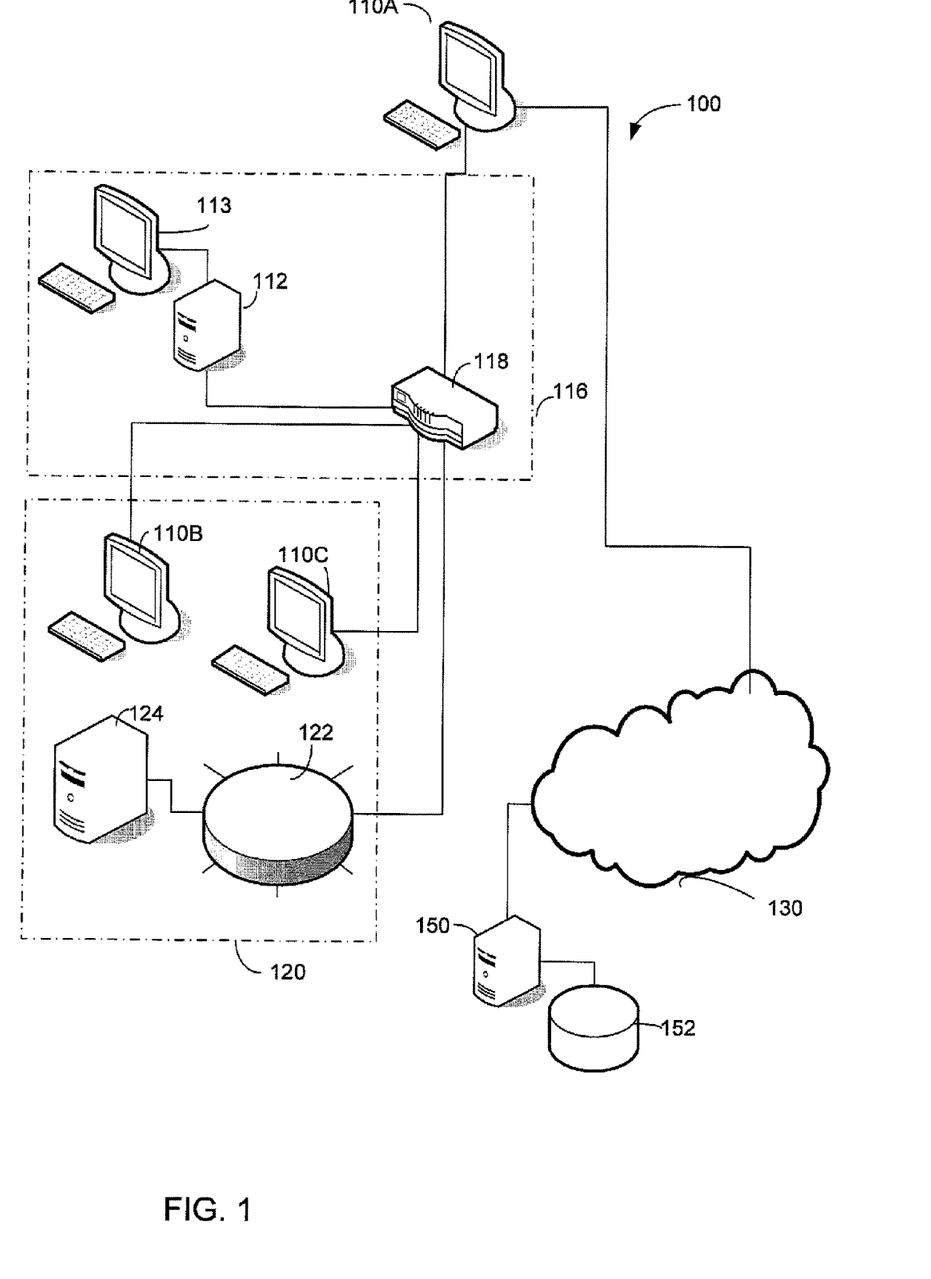
FIG. 1 is a sketch of an exemplary network environment in which client devices may be authenticated according to embodiments of the invention.

FIG. 1 shows a sketch of a computer system 100, which may be constructed from devices as are used in conventional computer systems. However, computer system 100 differs from a conventional computer system in that devices within computer system 100 are programmed to allow client authentication using functions of a client health enforcement framework.

Computer system 100 includes a private network, here illustrated as managed network 120, with multiple resources, such as server 124, connected to the network. Client devices may connect to the network and access the network resources. Though, the network is private because access to the network may be limited to only authorized client devices.

In this example, managed network 120 may be a network within a company or enterprise. Alternatively, managed network 120 may be a domain or other portion of a larger network. Managed network 120 may be managed by an individual or entity that provides access criteria for the network. In the exemplary system described herein the access criteria include both health policies and information from which authorized client devices may be identified.

Health policies may be health policies as are known in the art. For example, a health policy may specify that a device must have installed and be running a certain version of an anti-virus software package or that the device has a specific firewall version installed and enabled with specific settings that will block network traffic deemed unsecure. Though, any health policy or combination of health policies, whether now known or hereafter developed, may be employed.

As to the information from which an authorized client device may be identified, any suitable information may be used. In some embodiments, the device may be authenticated because a user of the device has been authorized to access the network. In those embodiments the authentication information may relate to a user of a device. Further, it is not necessary that an entire physical computer be authorized to access the network. For example, if a computer supports multiple user sessions, only a subset of the user sessions may be authorized to access the network. In those embodiments, the authentication information may relate to a specific user session or sessions. Accordingly, the invention is not limited by the type of entity for which authentication is provided.

As shown in FIG. 1, managed network 120 includes network devices such as server 124 and clients 110B and 110C. Here a wide area network (WAN) 122 is shown interconnecting the network devices. This configuration is shown for simplicity of illustration. A managed network may contain more devices than illustrated in FIG. 1. Likewise, a single WAN 122 is shown as an example of the interconnection architecture of managed network 120, but a managed network may contain different or additional interconnection architectures.

Devices may connect to managed network 120 through an access point. For simplicity, a single access point 116 is shown. The example of FIG. 1 shows that client 110B and 110C have already been given access to managed network 120. FIG. 1 shows client 110A seeking to connect to managed network 120 through access point 116, and is thus illustrated outside the managed network 120.

Access point 116 may be a wireless access point, hard wired access point or any other type of access point, whether now known or hereafter developed. In the example of FIG. 1, access point 116 includes a switching device 118 and a health policy server 112. Health policy server 112 may be configured as described in more detail below through user interface 113 or in any other suitable way.

Switching device 118 represents any of a number of types of switching devices that may be included in a network. Here switching device 118 illustrates a component of the transport layer of the network. Switching device 118 may be a device such as a router, switch, hub, gateway, or any other suitable switching device. Though in a commercial implementation, there may be multiple switching devices involved in the routing of packets as appropriate through a network, only one such device is shown for simplicity.

In operation, as a client, such as client 110A, seeks access to managed network 120, health policy server 112 determines whether client 110A should be given access to managed network 120. Health policy server 112 is programmed to determine whether to grant or deny network access in accordance with a client health policy. Health policy server 112 may determine, based on the health status of a device, whether the device can be granted network access. Additionally, health policy server 112 also may be configured to authenticate clients.

Health policy server 112 communicates a determination of network access to an enforcement mechanism. The enforcement mechanism may be contained within the transport layer of network 120. For example, health policy server 112 may communicate with switching device 118, indicating that switching device should route network packets to or from a device if network access is granted to that device, or should not route network packets to or from the device if network access is denied.

Neither the specific enforcement mechanism nor the specific mechanism by which health policy server 112 communicates with the enforcement mechanism are critical to the invention. Though, to implement health policy server 112, communication with an enforcement mechanism is employed, which may be performed in accordance with a known communication mechanism. As described herein, the same enforcement mechanism and the communication mechanism that is used for client health enforcement may be used to limit network access to only authenticated devices.

To implement authentication, health policy server 112 may receive authentication information about a client, such as client 110A. The authentication information may be obtained in any suitable way. The authentication information may be based in whole or in part on information input into client device 110A through a user interface of that device. Alternatively or additionally, the authentication information may be based in whole or in part on interactions with an external device. In such scenarios, the authentication information may be evidence of a successful authentication performed with the external device. Such evidence may be in the form of a certificate or other security token. The external device may such provide authentication information, which health policy server 112 may use to determine whether to grant access, and, if multiple levels of access are supported by the enforcement mechanism, the appropriate level of access.

In the embodiment illustrated in FIG. 1, that external device is authentication server 150. Authentication server 150 may authenticate a device in any suitable way. As illustrated, authentication server 150 may maintain a data store 152 of information about authorized devices that may be used identify whether a device is authorized. If two factor authentication is used, data store 152 may contain a list of authorized devices and security information, such as a password that should be provided by each authorized device. Though, any other suitable approach may be used and data store 152 may contain different or additional types of information, including pre-stored keys for authorized devices or other security information, used in authenticating authorized devices.

In the embodiment illustrated, client 110A is shown to access authentication server 150 over a public network 130, such as the Internet. In this embodiment, communications between client 110A and authentication server 150 may be encrypted or otherwise secured. Though, any suitable mechanism may be used for communication between client 110A and authentication server 150.

Also, in the embodiment illustrated, authentication server 150 is shown outside network 120. Other embodiments are possible, including having authentication server 150 on network 120. In some implementations of a client health enforcement system, a form of "quarantine" may be implemented by providing different levels of network access. A device with a health status that does not comply with a health access policy may be allowed limited network access. For a device in quarantine, the limited access may allow the device to access servers from which it can obtain protective software, updates for its protective components or other information needed to remediate the client so that it can be in compliance with the network health policy. Accordingly, some client health enforcement systems support limited access to selected network devices. Network 120 may be configured such that authentication server 150 is on network 120 and is one of the devices that can be accessed by a quarantined client. In this way, a device that does not have authentication information accepted by health policy server 112 may be placed in quarantine and allowed to communicated with authentication server 150 to obtain the authentication information. Accordingly, the location of authentication server 150 relative to network 120 is not critical to the invention.

Figure 2:
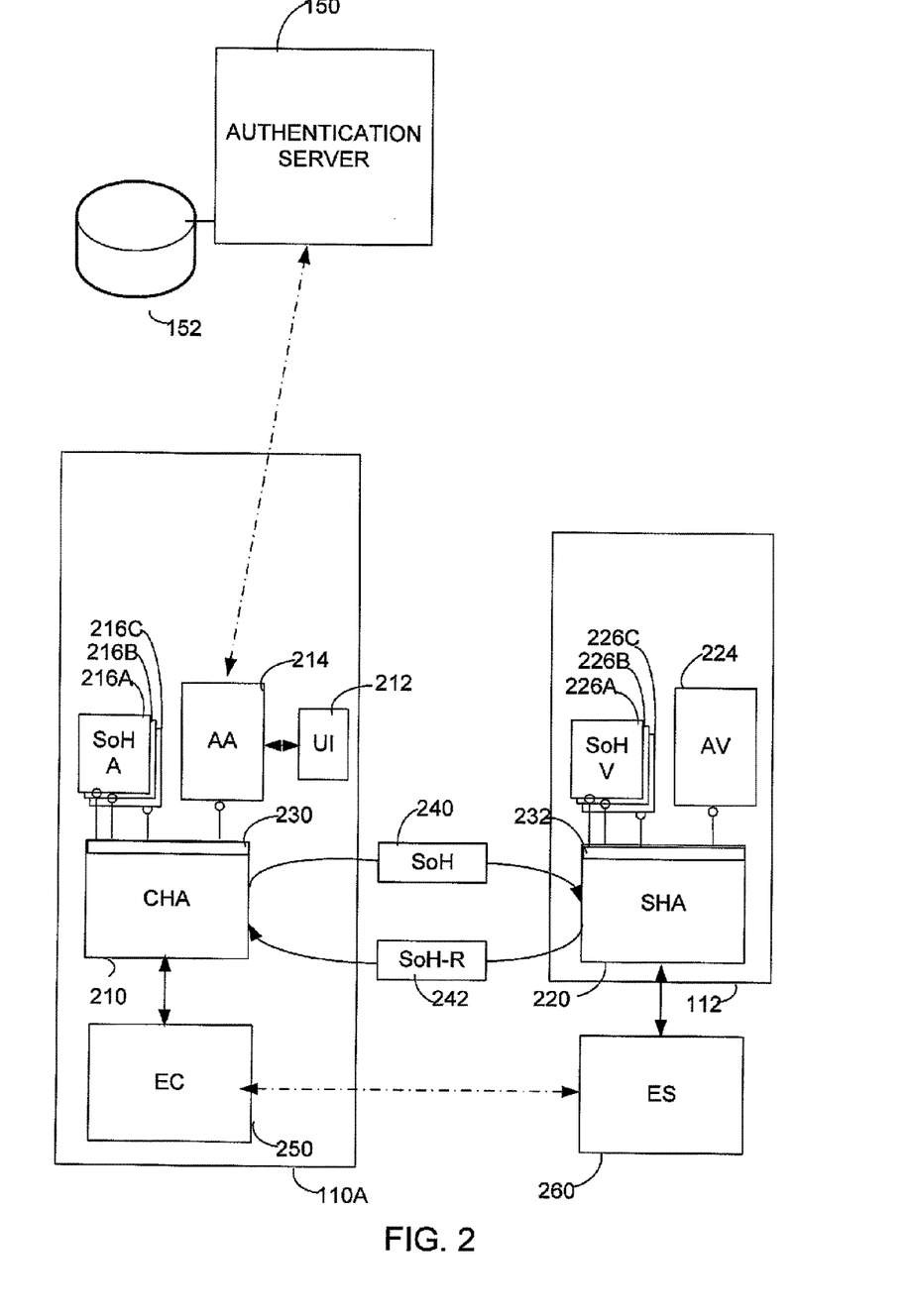
FIG. 2 is an architectural block diagram of components within a client device and a health policy server of FIG. 1.

Turning to FIG. 2, an architecture that may be used to implement client 110A and a health policy server 112 is shown. In the illustrated embodiment, client 110A may be implemented using techniques known in the art for constructing computing devices adapted to connect to networks. Client 110A is shown equipped with components that implement the client side of a client health enforcement framework. In the embodiment illustrated, those components include client health access agent 210, statement of health agents 216A, 216B, 216C, and enforcement client 250.

As in a conventional client health enforcement framework, client health access agent 210 collects health information relating to protective components on client 110A. Client health access agent 210 formats this information into a statement of health 240, which it communicates to health policy server 112.

In response to the statement of health, client 110A may receive a statement of health response 242 from server 112. Statement of health response 242 may, if client 110A is "healthy" enough to qualify for network access, indicate that access is granted. Conversely, if client 110A is not healthy, statement of health response 242 may indicate one or more components on client 110A that require remediation. In some embodiments, statement of health response 242 may also include information useful in remediating client 110A, such as a location of a remediation server that can provide required upgrades.

In the embodiment illustrated, client health access agent 210 receives health status information from statement of health agents, of which statement of health agents 216A, 216B and 216C are shown. In the embodiment illustrated, each statement of health agent provides information about a protective component. For example, a statement of health agent may be provided for each of an anti-virus component, a firewall and an update manager for an operating system. In FIG. 2, three statement of health agents are shown. Though, this number is shown for simplicity and any number of statement of health agents may be included.

Regardless of the number and type of protective components installed on client 110A and the number of associated statement of health agents, client health access agent 210 uses information from the statement of health agents to develop statement of health 240. Statement of health 240 may be in any suitable form. In the embodiment illustrated, the statement of health 240 may contain separate fields for information about each protective component for which client 110A has an associated statement of health agent. Though, other implementations are possible. For example, a statement of health may have a field for each protective component referenced in a network health policy whether or not such a protective component is installed on client 110A. Alternatively, the information from multiple statement of health agents may be aggregated into one or more combined values, which can then be forwarded to health policy server 112. Also, though a single statement of health combining configuration information about multiple protective components is described, it is possible that separate statements of health could be sent to communicate information about each protective component.

In the described embodiment, there is a one-to-one correspondence between statement of health agents and protective components. Though a one-to-one correspondence is not a requirement, it may facilitate implementation of a client health enforcement system because statement of health agents may be added or removed as protective components of client 110A are added or removed.

As illustrated, each of the statement of health agents interfaces with client health access agent 210 through a defined interface in the same format. In this example, interface 230 is shown. Each of the statement of health agents may be implemented as a plug in or using another mechanism that allows for dynamic linking between the statement of health agents and the client health access agent. In this way, a user or other party may readily install statement of health agents on client 110A to match the installed protective components that are required to comply with a network health access policy. In some embodiments, statement of health agents may be provided along with protective components, but such agents may be obtained from any suitable source at any suitable time. Accordingly, interface 230 may support registration of statement of health agents as they are installed, allowing client health access agent 210 to obtain information from any installed statement of health agents regardless of when such agents are installed.

The exchange of information between client health access agent 210 and statement of health agents 216A, 216B and 216C may be triggered by any suitable event or events and interface 230 may be configured to support communication of such events. When client 110A attempts to gain access to a network, for example, client health access agent 210 may request health information from each of the statement of health agents 216A, 216B and 216C so that agent 210 may generate a statement of health. Additionally or alternatively, whenever the status of any protective component changes, its associated statement of health agent may provide an update to client health access agent 210, which may then trigger again 210 to issue an updated statement of health.

Regardless of when health policy server 112 receives a statement of health from client 110A, at initial connection to the network or while client 110A is connected to the network, policy server 112 may process the statement of health to determine whether client 110A is in compliance with a network health policy such that client 110A may be granted access to the network or may continue to have network access. To process a statement of health, health policy server may include a server health agent 220 and one or more component health validators, of which component health validators 226A, 226B and 226C are shown.

Health policy server 112 may include a component health validator corresponding to each statement of health agent. Each validator may be configured to compare a portion of a statement of health to a health policy applicable to a protective component. Server health agent 220 parses statement of health 240 and provides portions generated by each statement of health agent 216A, 216B, 216C to a corresponding component health validator 226A, 226B or 226C.

In the example of FIG. 2, three component health validators are shown. However, this number is shown for illustration, and any suitable number of validators may be included. Though this number of validators provides a validator for each statement of health agent, a one-to-one relationship between statement of health agents and component health validators is not required. A health policy server may be configured with more validators than statement of health agents on any client so that the health policy server may process statements of health from multiple clients, each of which may have a different configuration of protective components. Also, though in the pictured embodiment each component health validator processes a portion of a statement of health from a single statement of health agent, in some embodiments, each component health validator may process health information from more than one component health validator.

Regardless of the number of component health validators, component health validators may be interfaced to server health agent 220 through a predefined interface 232. Interface 232 may support registration of new component health validators, allowing the component health validators to be dynamically linked to the server health agent. For example, each of the component health validators 226A, 226B, and 226C may be implemented as a plug-in. In this way, a network administrator or other party may readily install a component health validator on health policy server 112 to analyze health information provided by any client health agent on a device seeking network access.

In operation, when server health agent 220 receives a statement of health, server health agent 220 parses the statement of health and provides portions of the statement of health 240 to component health validators. Each component health validator compares the information contained in its respective portion of the statement of health to a health access policy and makes a health-based access determination. The determination may indicate that the client generating the statement of health is configured with a protective component or components that are in compliance with the policy or out of compliance with the policy. If the component or components are out of compliance, the component health validator may also indicate actions that are required to remediate the client so that it would be in compliance with the policy. For example, the component health validator may indicate a minimum software version of a protective component or associated data file required for compliance.

Regardless of the nature of the decision reached by the component health validator, the results from all of the component health validators may be provided to server health agent 220. Server health agent 220 may aggregate the results provided by component health validators 226A, 226B and 226C to make an overall decision whether client 110A is to be granted network access. In reaching an overall decision, any suitable algorithm may be used to aggregate responses from the component health validators. As one example, access may be granted only if the decisions received from all of the component health validators indicate that protective components on client 110A comply with the network health policy. Though, in other embodiments, access may be granted or denied using an algorithm that weights some forms of non-compliance as more serious than others and denies access only when more heavily weighted forms of non-compliance are detected or multiple less heavily weighted forms of non-compliance are detected.

Regardless of the mechanism used to aggregate results from the component health validators 226A, 226B and 226C, the results of the health assessment may be provided in statement of health response 242. By forming and sending a statement of health response to client 110A, server health agent 220 may signal to client device 110A the results of a health assessment. If client 110A is out of compliance with a network health policy, that fact may be indicated in the statement of health response 242. In such a scenario, the statement of health response 242 can indicate components that are out of compliance. In some embodiments, statement of health response 242 can also contain information relating to actions required to remediate client 110A so that it will be in compliance with the network health policy.

In addition to communicating a decision on the health status back to client 110A, server health agent 220 may also communicate a decision on network access to an enforcement mechanism. In the embodiment illustrated in FIG. 2, that decision is communicated to an enforcement server component 260 within the enforcement mechanism. Enforcement server component 260 presents a known interface to server health agent 220 that is adapted to receive an identification of a device and an access decision for that device. In the embodiment illustrated, the access decision could be a decision to grant network access, a decision to grant limited network access, such as to quarantine a client while it remediates, or a decision to deny network access. Though, in some embodiments, the enforcement mechanism may deny network access by default and express communication may be used only if the access decision is to grant at least limited network access.

Regardless of the form of interface between server health agent 220 and enforcement server component 260, the enforcement server component 260 controls the enforcement mechanism to implement the access decision for the client. The specific actions taken to implement an access decision may depend on the configuration of the network and the specific enforcement mechanism used. The enforcement actions, for example, may involve configuring switching devices within the transport layer to recognize or ignore messages to or from a device. As another example, in some embodiments, the enforcement actions may involve issuing a network address or setting an expiration time on a network address assigned to a client device.

On client 110A, the statement of health response 242 is received by client health agent 210, which responds based on the content of the response. If the statement of health response 242 indicates that remediation is required for any component or components, client health agent 210 may provide portions of statement of health response 242 to client health agents associated with those components. The client health agents may then remediate those components, such as by displaying information to a user or automatically attempting to download component updates. Because, in the embodiment illustrated, each statement of health agent is associated with a protective component, remediation actions can be tailored to the component.

In addition, client health agent 210 may communicate the access decision to a client-side enforcement component 250. When client 110A is granted at least limited network access, client side enforcement component 250 may interact with server enforcement component 260 to obtain a network address or otherwise engage in a protocol to obtain network access. The specific action and the specific protocol used to gain network access may depend on the specific enforcement mechanism in use on a network, but known techniques for obtaining network access may be used.

However, in the embodiment illustrated, interaction between client side enforcement component 250 and server enforcement component 260 need not include authentication of the client 110A to the enforcement mechanism. Rather, in the illustrated embodiment, authentication may be performed by authentication components that are incorporated into the client health enforcement framework provided by client health access agent 210 and server health agent 220.

In the embodiment of FIG. 2, authentication of client 110A is performed by an authentication agent 214 installed on client 110A and an authentication validator 224 installed on health policy server 112. Authentication agent 214 generates information indicating whether client 110A is authenticated for access to network 120. Authentication agent 214 may obtain such information in any suitable fashion. For example, FIG. 2 illustrates that an authentication agent 214 may interact with a user through a user interface 212. Through user interface 212, authentication agent 214 may obtain information as is known in the art for authentication of a client device. This information may include a user name and a password. As another example, information obtained through user interface 212 may include a fingerprint scan of a user or any other suitable information.

Alternatively, or additionally, authentication agent may interact with an external authentication mechanism. In the embodiment illustrated in FIG. 2, authentication server 150 is an example of an external authentication mechanism. Authentication agent 214 communicates with authentication server 150 to obtain information that may be provided to authentication validator 224 to demonstrate that client 110A is authorized for access to network 120. Authentication server 150 is trusted by authentication validator 224. Accordingly, if authentication server 150 issues a certificate in compliance with X.509 or some other token indicating that it has authenticated client 110A, authentication validator 224 may accept this token as an indication that client 110A is authenticated for access to network 120.

However, the specific format in which authentication server 150 indicates that client 110A is authenticated for access to network 120 is not critical to the invention, and any suitable mechanism may be used.

As a more specific example, authentication agent 214 may obtain identifying information about a user of client device 110A through user interface 212. This information may be provided to authentication server 150. Authentication server 150 may then access data store 152 containing information about authorized network users. Authentication server 150 may use known security techniques to compare the information received through authentication agent 214 to that in data store 152 to ascertain whether the user of client 110A is authorized for access to network 120. This comparison may be made using known security techniques, though any suitable mechanism may be used for ascertaining whether a user or other entity associated with client device 110A is authorized for network access.

Regardless of how authentication agent 214 obtains authentication information, that authentication information may be communicated to health policy server 112 as part of statement of health 240. In the embodiment illustrated, authentication information is incorporated into statement of health 240 by interfacing authentication agent 214 to the client health enforcement framework in the same fashion as statement of health agents 216A, 216B and 216C. In the embodiment of FIG. 2, authentication agent 214 interfaces to client health access agent 210 through interface 230. In this way, authentication agent 214 may register with client health access agent 210 in the same fashion as statement of health agents 216A, 216B and 216C. When client health access agent 210 generates statement of health 240, it therefore obtains from authentication agent 214 authentication information, which client health access agent 210 uses as it formats statement of health 240.

On health policy server 112, server health agent 220 will receive statement of health 240 incorporating authentication information. Server health agent 220, as it parses statement of health 240, will direct the authentication information provided from authentication agent 214 to a corresponding authentication validator 224. As shown, authentication validator 224 interfaces to server health agent 220 through interface 232 in the same way as component health validators 226A, 226B and 226C. Accordingly, once authentication validator 224 registers with server health agent 220 through interface 232, server health agent 222 can direct the authentication information for processing within authentication validator 224.

Authentication validator 224 may be configured to validate whether the authentication information contained within statement of health 240 indicates that client 110A is authenticated for network access. In an embodiment in which the authentication information includes a certificate or other token from authentication server 150, authentication validator 224 may determine whether client device 110 is authenticated for network access by determining whether the certificate or other token was generated by authentication server 150. Authentication validator 224 may make such a determination using known methods, such as by applying a public key to the token to determine whether it contains information encrypted with a private key held by authentication server 150. As another example, authentication validator 224 may communicate the authentication information received to authentication server 150, and authentication server 150 may reply with an indication of whether client 110A is authenticated. However, any suitable mechanism may be employed by authentication validator 224 to determine whether information in statement of health 240 is trusted as an authentication of client device 110.

Authentication validator 224, based on an analysis of authentication information included within statement of health 240, may provide an indication to server health agent 220 whether client 110A can be granted access to network 120. Information provided by authentication validator 224 may be formatted in the same format as health decisions provided by component health validators such as validators 226A, 226B and 226C. In this example, authentication validator 224 responds with an indication that client device 110A can be granted access, should be denied access or should take further steps in order to obtain access. When further steps are required, authentication validator 224 may format such an indication as a requirement in the same format as directions from component health validators 226A, 226B or 226C that client 110A needs remediation.

By using the remediation format, authentication validator 224 may provide information needed by client 110A to perform additional authentication steps. For example, authentication validator 224 may provide information that can be used to perform channel binding as part of a "remediate" message. As a more specific example, such a remediation message may include a challenge generated specifically for client 110A. Server health agent 220 will format this challenge in statement of health response 242 in the same way that it formats other remediation information that it may obtain from component health validators 226A, 226B and 226C. Accordingly, client health access agent 210, upon receipt of statement of health response 242 will parse the statement of health response 242 and provide the challenge information to authentication agent 214 in the same way in provides remediation information to statement of health agents 216A, 216B or 216C. Accordingly, the client health enforcement framework provides a mechanism for the challenge to be passed to authentication agent 214.

Authentication agent 214 may in turn provide the challenge to authentication server 150. Authentication server 150 may incorporate the challenge into the authentication information it provides to authentication agent 214. Authentication agent 214 can then provide this authentication information, including the challenge to client health access agent 210. Client health access agent 210 may then generate a new statement of health, including authentication information obtained by authentication agent 214 using the challenge.

This new statement of health, upon receipt by server health agent 220, will again be directed to authentication validator 224. Authentication validator 224 upon receiving the authentication information with the challenge can determine that the authentication information was newly obtained by client 110A and was not a copy of previously generated authentication information. In response, authentication validator 224 may indicate to server health agent 220 that client 110A is authenticated for network access.

Server health agent 220 may combine that authentication information along with decisions rendered by component health validators 226A, 226B or 226C indicating whether client device 110A is appropriately configured according to the health policies of the network. Server health agent may use this combined information to make an overall assessment of whether network access can be granted to client device 110A.

The access decision, based on both client health and authentication, may be provided by server health agent 220 to server enforcement component 260. Server enforcement component 260 may then, as described above, configure the network 120 to allow or block access by client 110A as appropriate based on the determination made by server health agent 220. With this technique, server enforcement component 260 does not need to take further steps to authenticate client 110A, because such authentication has been incorporated into the access decision made by server health agent 220.

Figures 3A, 3B:
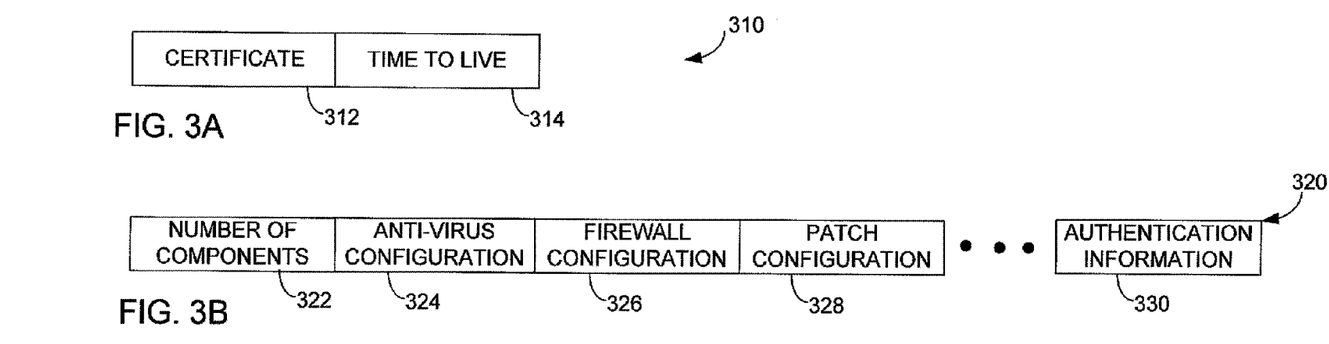
FIGS. 3A, 3B, 3C and 3D are sketches illustrating examples of the configuration of messages that may be employed for communication between components illustrated in FIG. 2.

Information exchange between the components used to perform authentication may be formatted in any suitable way. FIGS. 3A, 3B, 3C and 3D illustrate examples of message formats that may be used. FIG. 3A illustrates a message 310 that may be used for initial communication between authentication agent 214 and an external device such as authentication server 150. In this example, message 310 may be sent from authentication server 150 to authentication agent 214 in response to actions by authentication agent 214 to authenticate client device 110A. Message 310 includes a field 312 holding a certificate issued by authentication server 150 when client 110A is authenticated. Field 314 in message 310 may include a time to live value, a time stamp or other information indicating a period of time over which the authentication provided by authentication server 150 is valid to authenticate client 110. Though, such time values are optional and may be omitted. Alternatively, such a time value may be included within certificate 312 or otherwise encapsulated in message 310.

FIG. 3B illustrates an example of a message 320 representing a statement of health, such as statement of health 240. In this example, message 320 contains fields, each associated with a statement of health agent. For example, field 324 is shown to contain information about an anti-virus configuration. Such information may be generated by a statement of health agent associated with anti-virus software. Likewise, field 326 is illustrated containing information about a firewall configuration. Information in field 326 may be generated by a statement of health agent associated with a firewall installed on client 110A. Field 328 is shown to include information about the patch configuration of client 110A. Such information may be generated by a statement of health agent associated with an update manager within the operating system of client 110A.

In the same fashion, field 330 contains security information. Security information in field 330 may be generated by authentication agent 214. The security information may include the certificate and time to live information obtained in message 310 from authentication server 150. However, authentication agent 214 may format security information 330 in any suitable format that can be recognized by authentication validator 224.

Message 320 may also include information about the number of components for which information is provided in message 320. As described above, interface 230 allows component agents to be added to the client health enforcement framework by registering with client health access agent 210. Accordingly, at different times the number of components about which client health access agent 210 has information may vary, depending on the number of installed components. Accordingly, message 320 may include a field 322 indicating the number of components for which information is provided in message 320. It should be appreciated that field 322 is a schematic representation that message 320 may contain information that can be used by server health agent to appropriately parse message 320 into information associated with specific components. This information need not be provided in a single field as illustrated and instead may be provided through the format of message 320 or using other mechanisms. Regardless of how this the "count" information is formatted, of the count of components includes authentication agent 214 because client health access agent 210 treats authentication agent 214 as an additional component agent.

Figure 3C:
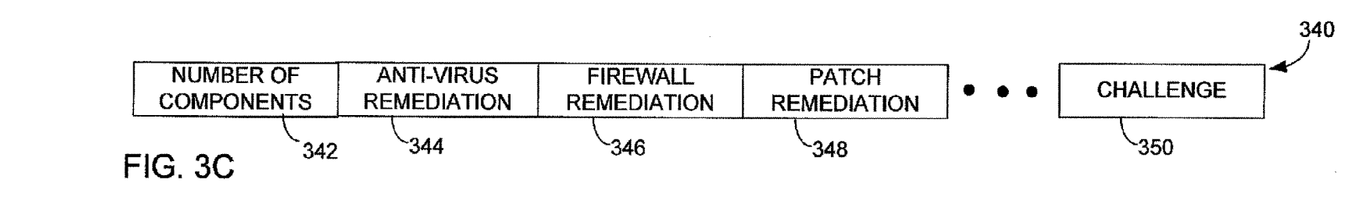

FIG. 3C illustrates a message 340 that may be a statement of health response, such as statement of health response 242. As with message 320, message 340 includes information indicating the number of components about which information is provided. In making this count, authentication validator 224 is treated as an additional component. As with message 320, message 340 is shown schematically to contain a field 342 indicating the number of components about which information is provided. However, any suitable format or mechanism may be used to allow client health access agent 210 to identify the number of components for which information is provided in message 340.

In this example, message 340 contains a field corresponding to each of the fields in message 320. Each field indicates whether, for the associated component, remediation is required. Accordingly, in the examples of FIGS. 3B and 3C, field 344 contains information about whether remediation is required for the anti-virus software installed on client device 110A. Field 346 contains information indicating whether remediation is required for the firewall installed on client device 110A. Field 348 contains information indicating whether patches to the operating system are required.

Each field of message 340 may also include information about how remediation of a component is to be performed. Field 350 may contain information generated by authentication validator 224 in response to the security information contain within field 330 of message 320. The information in field 350 may indicate whether client device 110A is authenticated for network access. Though, there may be no authentication component on client 110A that requires remediation, field 350 may nonetheless contain information in addition to whether the authentication information adequately authenticates client 110A for network access. Information used during authentication process may be provided by authentication validator 224 and inserted in field 350 like remediation information. In some embodiments, authentication validator 224 may package information used in a multi-step validation process as remediation information. Accordingly, field 350 may contain information generated by authentication validator 224 directed for authentication agent 214 to be used as a subsequent step in a validation process.

In the embodiment illustrated in FIG. 3C, field 350 includes a challenge that may be used to perform channel binding. However, any suitable information used in an authentication exchange between authentication agent 214 and authentication validator 224 may be formatted as remediation information so that it will be communicated through the client health enforcement framework without modification to server health agent 220 or client health access agent 210.

Figure 3D:
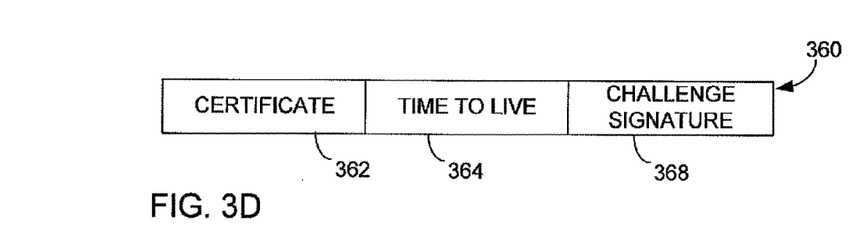

FIG. 3D illustrates a further message 360 that may be obtained by authentication agent 214 from authentication server 150 in response to receiving remediation information. In the embodiment illustrated in FIG. 3C, authentication agent 214, in response to a remediation indication including a challenge as in field 350 (FIG. 3C), may initiate an authentication process with authentication server 150. In the authentication process, authentication agent 214 may provide the challenge from field 350 to authentication server 150. Accordingly, when authentication server 150 responds with the message 360, in addition to including a certificate in field 362 and a time to live value in field 364, similar to those included in fields 312 and 314 (FIG. 3A), authentication server 150 may incorporate the challenge in a fashion that allows authentication validator 224 to recognize that message 360 was generated in response to its challenge. In this way, authentication validator 224 can distinguish between security information generated by authentication server 150 for a specific client and previously generated authentication information that may have been intercepted and used by a device other than the client for which the security information was generated.

Figure 4:
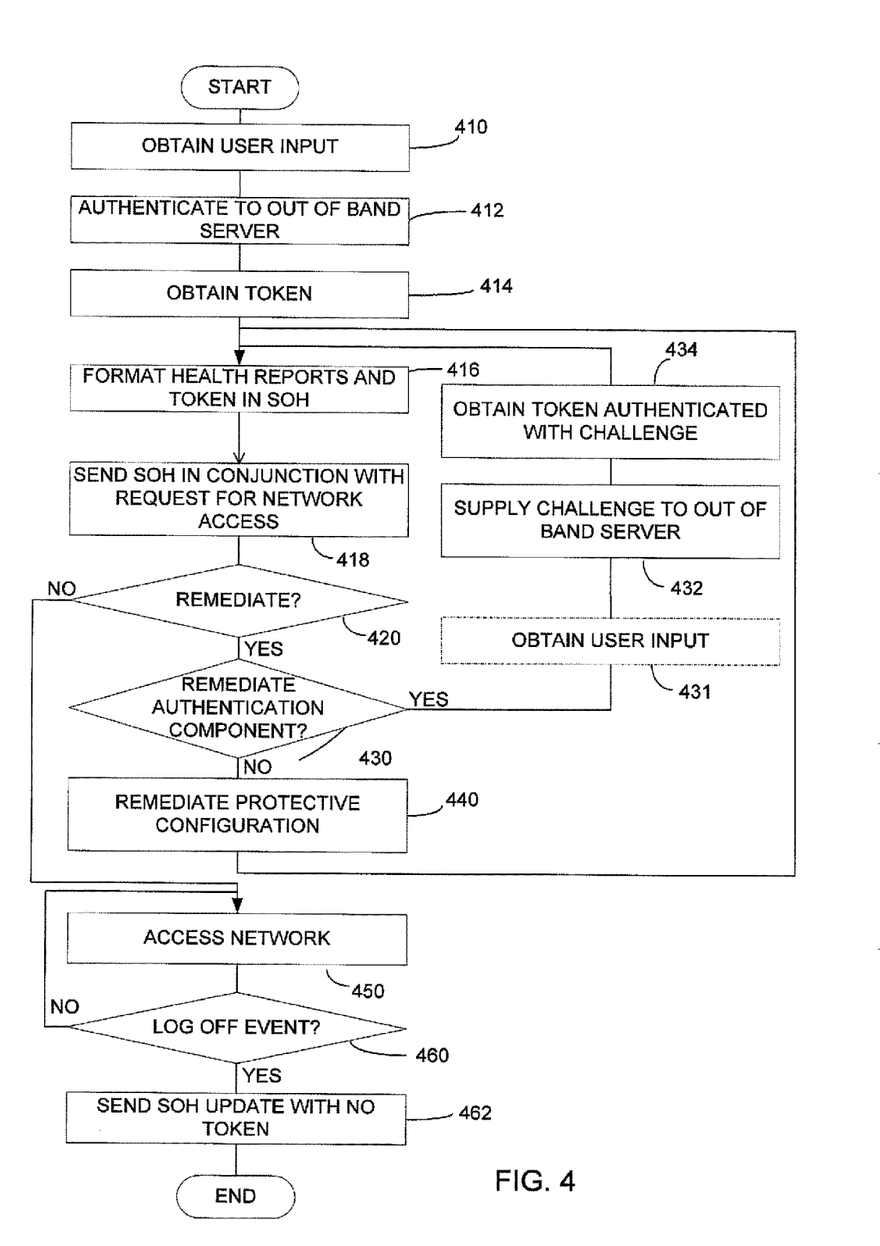
FIG. 4 is a flow chart of a process that is an example of a method of operating a network according to some embodiments of the invention.

Turning to FIG. 4, a process of operation of the system of FIG. 1 is illustrated. The process of FIG. 4 provides an example of a method by which a network may be operated such that a client health enforcement framework is used for authenticating a client. In addition, FIG. 4 illustrates that features of the client health enforcement framework may be adapted to provide functions associated with client authentication. In the example illustrated, the ability of the framework to respond to changes in client health may be adapted to implement a logoff function associated with authentication.

The process of FIG. 4 may begin in response to any event that may trigger a device to attempt to authenticate itself to a network. For example, the process of FIG. 4 may be initiated upon power up of client 110A if a setting within client 110A indicates that network 120 (FIG. 1) is a default network to which client 110A should connect upon power up. Alternatively, the process of FIG. 4 may begin in response to a user command to connect to network 120 or other suitable triggering event.

Regardless of how the process of FIG. 4 is triggered, the process begins at block 410. At block 410, user input is obtained. This input provides information that may be used in authenticating client 110A. User input may be in the form of a user name and password pair. Though, input may be obtained in any suitable format. Regardless of the manner in which user input is obtained, the process then proceeds to block 412 where client device 110A authenticates itself with an out of band server. In the embodiment of FIG. 2, this out of band server is authentication server 150 and the processing of block 412 is performed by authentication agent 214. However, any suitable mechanism of authenticating a client device may be used.

At block 414, the client, once it successfully authenticates using the out of band server, obtains authentication information indicating the client computer is authenticated to access the network. In this example, the authentication information may be formatted as a certificate or some other token.

At block 416, client device 110A forms a statement of health including the token obtained at block 414. In the example of FIG. 4, the statement of health also includes health reports that may be obtained from other components executing within client 110A. The statement of health may be formatted as message 320 in FIG. 3B. However, any suitable format may be used for a statement of health. The statement of health may be formed by client access agent 210 (FIG. 2), but any suitable mechanism may be used for forming a statement of health.

At block 418, client device 110A sends the statement of health formatted in block 416 in conjunction with a request for network access. The request may be made in the same fashion that is used by known client health enforcement frameworks. However, the specific format for requesting network access is not critical, and any suitable mechanism for requesting network access may be used.

The process then proceeds to decision block 420. At decision block 420, the process branches depending on the response received to the request for network access sent in block 418. If the response includes a direction that client device 110A requires remediation, the process proceeds to decision block 430. Alternatively, if the response contains no indication that remediation is required, the process may branch to block 450, bypassing remediation processing.

In scenarios in which remediation is required, the process may branch from decision block 420 to decision 430. At decision block 430, the process may again branch depending on whether remediation is indicated for an authentication component. In an embodiment in which a health policy server responds with a response in the form of message 340 (FIG. 3C), a challenge in field 350 indicates further processing is required to authenticate the client device. When such a message is received, the process branches from decision block 430 to block 431

At block 431, further user input may optionally be obtained. At block 432, client 110A may provide either the user input obtained at block 431 or the user input obtained at block 410 along with information included in the remediation message, here illustrated as a challenge from health policy server 112, to an out of band server as part of a subsequent authentication process. The out of band server accessed at block 432 may be the same server accessed at block 412. The authentication process used at block 432 may be the same as used at block 412 with the addition of the challenge. However, processing at block 432 may employ any suitable authentication mechanism.

FIG. 4 illustrates a process flow authentication at block 432 is successful. In response to a successful authentication, a block 434 client device 110A may obtain a token authenticated with the challenge supplied in block 432. Any suitable mechanism may be used to incorporate the challenge with a token to demonstrate that the token was generated in response to receipt of the challenge. As one example, the challenge may be concatenated with the token and both may be signed with a key of the device generating the token.

Regardless of how the challenge is used to authenticate the token, the authenticated token obtained at block 434 may be used as the process loops back to block 416. At block 416, a new statement of health may be generated and sent at block 418 in conjunction with a request for network access. If the authentication process completes when a token authenticated with a challenge is provided, the client should not receive a response indications that remediation is required. The process may then branch from decision block 420 to block 450 where network access is obtained.

However, in embodiments in which further exchanges are required between authentication components, the process may further include additional processing to generate information used in further exchanges as part of the authentication process. In these exchanges, information to be sent to the server may be formatted in a statement of health. Information to be sent to the client may be formatted as a remediation directive in a statement of health response. In this way, as many exchanges as are required to complete authentication according to any desired protocol may occur with an authentication agent 214 sending authentication related information in the statement of health and an authentication validator 224 sending responses or other authentication information in a statement of health response. Regardless of the number of exchanges required for authentication of client device 110A, changes, relative to a configuration conventionally used for client health enforcement, are not required to either client health access agent 210 or server health agent 220 for this authentication to be performed.

Regardless of the number of iterations required to complete the authentication process, when the authentication process is completed, authentication validator 224 will indicate that access may be granted to client 110A without remediation. Accordingly, the process will branch from decision block 420 to block 440 if no other components require authentication. Though, if other components require authentication, the process will branch from decision block 430 to block 440. At block 440, the protective components installed on client device 110A may be remediated. Remediation of protective components may be performed using mechanisms as known in the art and may be based on the specific information contained in the statement of health response associated with each protective component.

Following remediation of the protective components, the process may again loop back to block 416 where a new statement of health will be generated. The new statement of health may indicate both that the client device 110A has authenticated and remediated its protective components and satisfies both the health policies and authentication requirements of network 120. When this occurs, the client 110A will be able to access the network at block 450. Once network access is available to client 110A, client 110A may access devices on network 120, such as server 124, or perform other network operations in accordance with the network access granted.

Of course, though not expressly shown in FIG. 4, if a device cannot complete authentication, the process of FIG. 4 will never reach block 450 and the device will not be granted network access.

In some embodiments, network access may continue indefinitely. However, in some embodiments, a network may be implemented to recognize one or more logoff events. When no logoff events are detected, the process of FIG. 4 may loop back to block 450, allowing client 110A to continue with network access. However, if a logoff event is detected, the process may branch from decision block 460 to block 462. In this example, logoff events are detected by authentication agent 214.

In the example illustrated, logoff events may be associated with user input. For example, authentication agent 214 may recognize as a logoff event a specific command received through user input 212 to logoff the network. However, other forms of logoff events may be recognized. For example, authentication agent 214 may track user activity and may deem that a logoff event has occurred if user activity is not detected during some interval. Monitored user activity may relate to network functions or may relate more generally to any interaction with client device 110A. As another example of a logoff event, if authentication agent 214 receives a message in the form of message 310 from authentication server 150, authentication agent 214 may generate a logoff event at a time indicated by the time to live value in field 314 of message 310 (FIG. 3A).

Regardless of how the logoff event is defined, when such an event occurs, processing may branch from decision block 460 to decision 462. This branching, for example, may occur when authentication agent 214 signals client health access agent 210 through interface 230 that a status change has occurred. In response to such a notification, an updated statement of health may be sent at block 462. Processing at block 462 may be performed by client health access agent 210 and may be performed similarly to processing described in conjunction with block 418. However, at block 462, because the authentication of client 110A is expired or is being revoked, the statement of health sent at block 462 contains no token indicating that client device 110A has been authenticated. Accordingly, in response to a statement of health sent at block 462, authentication validator 224 (FIG. 2) will indicate that client 110A should be denied network access. In response to such an indication, server health agent 220 will communicate with server enforcement component 260, indicating that the network access for client 110A should be revoked. The server enforcement component 260 will then revoke network access for client 110A. The specific mechanism by which server enforcement component 260 revokes access is not critical to the invention and may depend on the specific transport mechanism used in network 120.

Regardless of the specific enforcement mechanism used, the process of FIG. 4 may then end. However, a client device may again obtain network access by repeating the process of FIG. 4 at a subsequent time.

Having thus described several aspects of at least one embodiment of this invention, it is to be appreciated that various alterations, modifications, and improvements will readily occur to those skilled in the art.

For example, embodiments in which authentication of a client device is performed by an out of band mechanism were described. In those embodiments, an authentication component validates whether the authentication information contained within the statement of health is from a trusted source. Though, some or all of the authentication functions performed by the out of band mechanism may be performed by interactions between authentication agent 214 and authentication validator 224.

As an example of another variation, it is described above that a single authentication agent and a single authentication validator are used. Because the interfaces to the client health enforcement system support multiple components, multiple authentication agents, each using a different authentication method, could be installed on a client device, with corresponding authentication validators. The client would have to authenticate in accordance with each method for the server health agent 220 to indicate access could be granted to a client. In this way, multiple authentication mechanisms may be easily combined.

Likewise, though embodiments are described in which authentication information is generated by an authentication server 150, some or all of the actions performed by authentication server 150 to generate authentication information may be performed by an authentication agent 214.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method, the method comprising:
    requesting authentication to an out-of-band server; in response to the request, obtaining, at a client computer, authentication information, from the out-of-band server, indicating that the client computer is authenticated to access a network;
    formatting, at the client computer, a statement of health to include the authentication information; and
    requesting network access to a first server, the request including the statement of health the first server differing from the out-of-band server; and
    when the statement of health is not in compliance, receiving a response including at least one remediation that is needed before access to the network is granted,
    wherein the authentication performed in the out-of-band server does not interface with the first server that grants access to the network.

2. The method of claim 1, wherein the remediation is associated with a protective configuration and the method further comprising:
    remediating the protective configuration;
    formatting, at the client computer, a second statement of health, the second statement of health including the authentication information; and
    providing the second statement of health to the first server in connection with a request for network access.

3. The method of claim 1, wherein the remediation is associated with the authentication information and the method further comprising:
    obtaining a second authorization authentication information, the second authentication information indicating that the client computer is authenticated to access the network;
    formatting, at the client computer, a second statement of health, the second statement of health including the second authorization authentication information; and
    providing the second statement of health to the first server in connection with a request for network access.

4. The method of claim 1, further comprising:
    receiving a security token as the authentication information from the out-of-band server.

5. The method of claim 1, wherein:
    the method further comprises
        generating anti-virus configuration information indicating a configuration of anti-virus software on the client computer; and
        formatting the statement of health further comprises formatting the statement of health to include the anti-virus configuration information.

6. The method of claim 1, further comprising:
    monitoring user interactions with the client computer; and
    when user interactions are not detected for a period of time exceeding a threshold, sending to the first server an indication that the statement of health of the client computer has changed.

7. The method of claim 1, further comprising:
    receiving user input indicating a network logoff; and
    in response to the user input, sending to the first server an indication that the statement of health of the client computer has changed.

8. A client computer comprising:
    a client health enforcement framework having a client health access agent adapted to obtain information from one or more statement of health agents through an interface and to send a statement of health to a health policy server, the health policy server configured to grant access to a network based on a validated statement of health; and
    an authentication agent for authenticating the client computer for access to the network to an out-of-band server and that provides authentication information indicating authentication status of the client computer to the client health access agent through the interface,
    whereby the client health access agent requests network access to the health policy server with a statement of health including the authentication information and when the statement of health does not comply with a health policy, receive a response from the health policy server, indicating at least one remediation that is needed before access to the network is granted,
    wherein the authentication agent does not interface with the health policy server that grants access to the network.

9. The client computer of claim 8, wherein the client health enforcement framework is configured to authorize access that times out, and the client health access agent is adapted to poll each of the one or more statement of health agents and the authentication agent for status information when the authorization times out.

10. The client computer of claim 9, wherein, the authentication agent is adapted to re-authenticate the client computer in response to being polled by the client health access agent for status information.

11. The client computer of claim 9, wherein:
    the one or more statement of health agents is each adapted to communicate a change of health status indication through the interface;
    the client health access agent is adapted to communicate a health status change to the health policy server in response to a change of health status indication through the interface; and
    the authentication agent is adapted to communicate a change of health status indication through the interface in response to detecting user inactivity exceeding a threshold period of time.

12. The client computer of claim 11, wherein the authentication agent is further adapted to communicate a change of health status indication through the interface in response to user input indicating a network logoff.

13. The client computer of claim 12, wherein the one or more statement of health agents comprise an anti-virus agent adapted to indicate a configuration of anti-virus software executing on the client computer.

14. A method of operating a network, the method comprising:
    configuring a client computer to include a client health access agent being adapted to obtain health information from one or more statement of health agents executing on the client computer and to provide, based on the obtained health information, a statement of health to a health policy server;
    in an authentication agent on the client computer, requesting authentication from an authentication server and in response to the request, obtaining authentication information indicating whether the client computer is authorized for network access from the authentication server and providing the authentication information to the client health access agent; and
    in the client health access agent, generating a statement of health for the client computer including the authentication information and the health information from the one or more statement of health agents and requesting network access by sending the statement of health to the health policy server, in the client health access agent, when the health information is out of compliance, receiving a response from the health policy server indicating at least one remediation measure needed to obtain network access, wherein the health policy server and the authentication server differ, wherein the authentication agent does not interface with the health policy server that grants access to the network.

15. The method of claim 14, wherein:

the authentication agent is configured as a plug-in for the client health access agent, and the authentication agent provides a user interface to obtain authentication parameters from a user.

16. The method of claim 14, wherein:

when the health policy server determines that one or more portions of the statement of health is out of compliance with an access policy, the health policy server responds with an instruction to remediate a component associated with each of the one or more portions; and when the instruction to remediate is associated with the authentication information in the statement of health, the instruction to remediate includes challenge information;

following remediation by the authentication agent, when the client health access agent submits a subsequent statement of health to the health validation server, the subsequent statement of health includes the challenge information signed by the authentication server.

17. The method of claim 14, further comprising:

configuring a health policy server to provide a portion of the statement of health to each of one or more component health validators and to selectively authorize network access based on results of processing of respective portions of the statement of health by the one or more component health validators; and providing a portion of the statement of health corresponding to the authentication information to an authentication validator and selectively authorizing network access based in part on processing of the authentication information within the authentication validator.

18. The method of claim 17, wherein:

the one or more statement of health agents comprises a statement of health agent adapted to determine a configuration of at least one protective component on the client computer;

generating the statement of health comprises incorporating configuration information identifying the configuration of the at least one protective component;

the method further comprises, in the health policy server, providing a second portion of the statement of health corresponding to the configuration information to a component health validator; and selectively authorizing network access further comprises authorizing network access based in part on processing of the configuration information within the component health validator.

* * * * *